United States Patent
Nagai et al.

(10) Patent No.: US 8,986,877 B2
(45) Date of Patent: Mar. 24, 2015

(54) BATTERY HAVING FLAT TERMINALS

(75) Inventors: Hiroki Nagai, Nagoya (JP); Satomi Kawase, Aichi-ken (JP); Tooru Nakai, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 989 days.

(21) Appl. No.: 12/669,583

(22) PCT Filed: Jul. 22, 2008

(86) PCT No.: PCT/IB2008/001897
§ 371 (c)(1),
(2), (4) Date: Jan. 19, 2010

(87) PCT Pub. No.: WO2009/013592
PCT Pub. Date: Jan. 29, 2009

(65) Prior Publication Data
US 2010/0203371 A1 Aug. 12, 2010

(30) Foreign Application Priority Data
Jul. 23, 2007 (JP) ................. 2007-191447

(51) Int. Cl.
H01M 2/02 (2006.01)
H01M 2/26 (2006.01)
H01M 2/30 (2006.01)
H01M 10/0525 (2010.01)

(52) U.S. Cl.
CPC ............. *H01M 2/266* (2013.01); *H01M 2/30* (2013.01); *H01M 10/0525* (2013.01); *Y02T 10/7011* (2013.01)
USPC ............................. 429/179; 429/178

(58) Field of Classification Search
USPC ....................... 429/160, 178, 179
See application file for complete search history.

(56) References Cited

U.S. PATENT DOCUMENTS

| 2003/0031923 A1 | 2/2003 | Aoshima et al. |
| 2007/0009793 A1 | 1/2007 | Kim et al. |
| 2007/0117009 A1* | 5/2007 | Yamauchi et al. ............ 429/160 |

FOREIGN PATENT DOCUMENTS

| CA | 2 582 030 | 4/2006 |
| JP | 8-185850 | 7/1996 |
| JP | 11-204101 | 7/1999 |
| JP | 2000-150306 | 5/2000 |
| JP | 2002-117825 | 4/2002 |

(Continued)

OTHER PUBLICATIONS

"Notification of Reason(s) for Refusal" in Japanese Patent Application No. 2007-191447, filed Jul. 23, 2007 (Drafting date: Dec. 8, 2009).

(Continued)

*Primary Examiner* — Muhammad Siddiquee
(74) *Attorney, Agent, or Firm* — Finnegan, Henderson, Farabow, Garrett & Dunner, LLP

(57) ABSTRACT

A battery (100) provided by the invention includes an electrode assembly (30) having a current collector forming a positive electrode and a current collector forming a negative electrode; and a flat terminal (10a, 10b) joined to each current collector. The flat terminal (10a, 10b) has a flat portion (12) including a joint area (11) joined to the corresponding the current collector, and the flat terminal has a first curved portion (14) that is formed away from the joint area along the longitudinal direction (13) of the flat terminal.

13 Claims, 6 Drawing Sheets

WIDTH (AXIS) DIRECTION

(56) References Cited

FOREIGN PATENT DOCUMENTS

| | | |
|---|---|---|
| JP | 2002-231214 | 8/2002 |
| JP | 2003-249423 | 9/2003 |
| JP | 2004-71199 | 3/2004 |
| JP | 2004-241328 | 8/2004 |
| JP | 2004-273178 | 9/2004 |
| JP | 2005-203192 | 7/2005 |
| JP | 2006-164922 | 6/2006 |
| JP | 2006-236790 | 9/2006 |
| JP | 2009-32670 | 2/2009 |
| KR | 10-2009-0004503 | 1/2009 |
| WO | WO 03/094258 | 11/2003 |
| WO | WO 2006/037790 | 4/2006 |

OTHER PUBLICATIONS

Third-Party Submission Under 37 C.F.R. § 1.99, apparently filed by a third party in U.S. Appl. No. 12/669,583 on or about Nov. 8, 2010.
Letter from Mark D. Saralino to Anthony Gutowski dated Nov. 8, 2010.
Notification of Reason(s) for Refusal for KR Appl. No. 10-2010-7001165 dated Apr. 25, 2011.

* cited by examiner

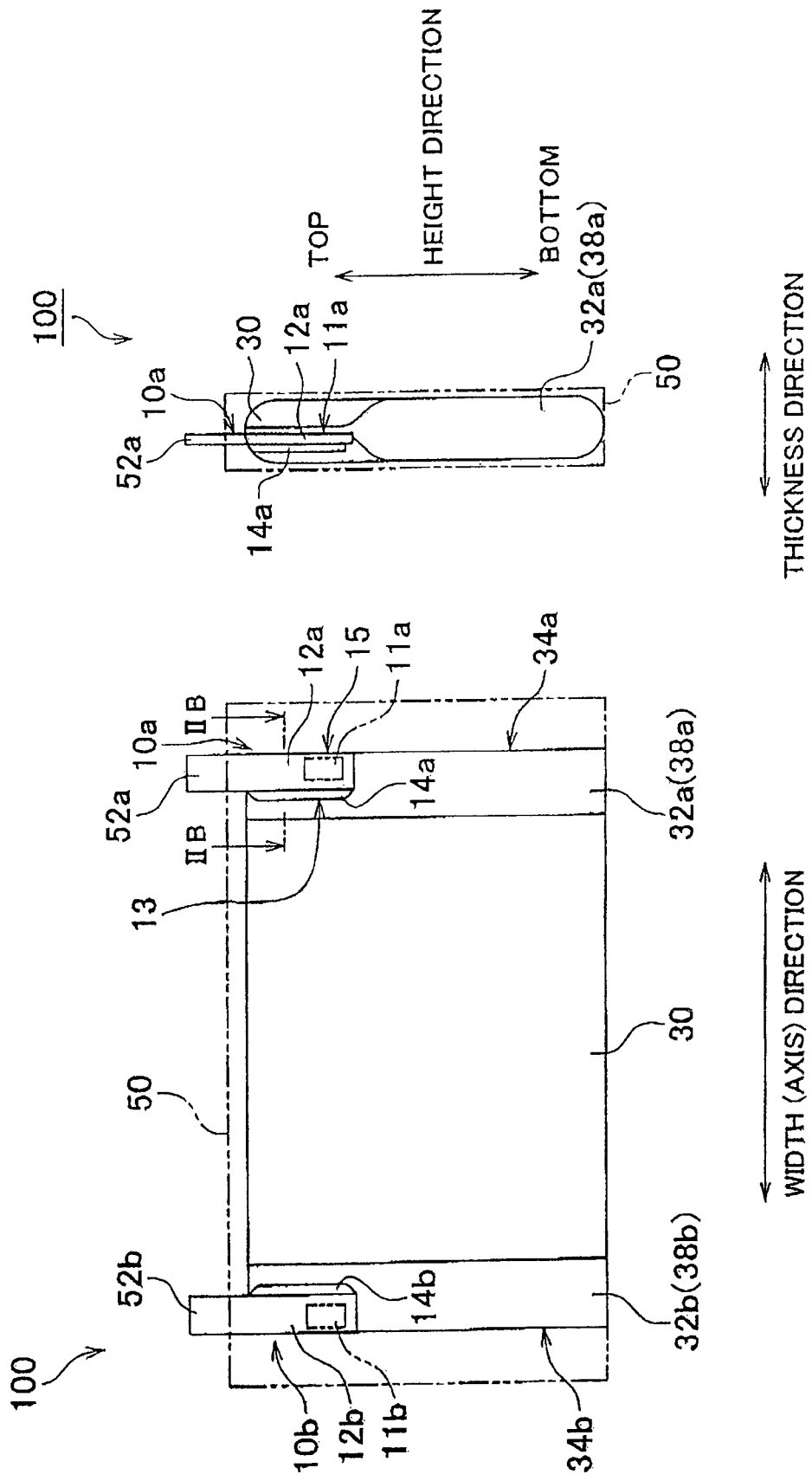

WIDTH (AXIS) DIRECTION

THICKNESS DIRECTION

WIDTH (AXIS) DIRECTION

F I G . 3
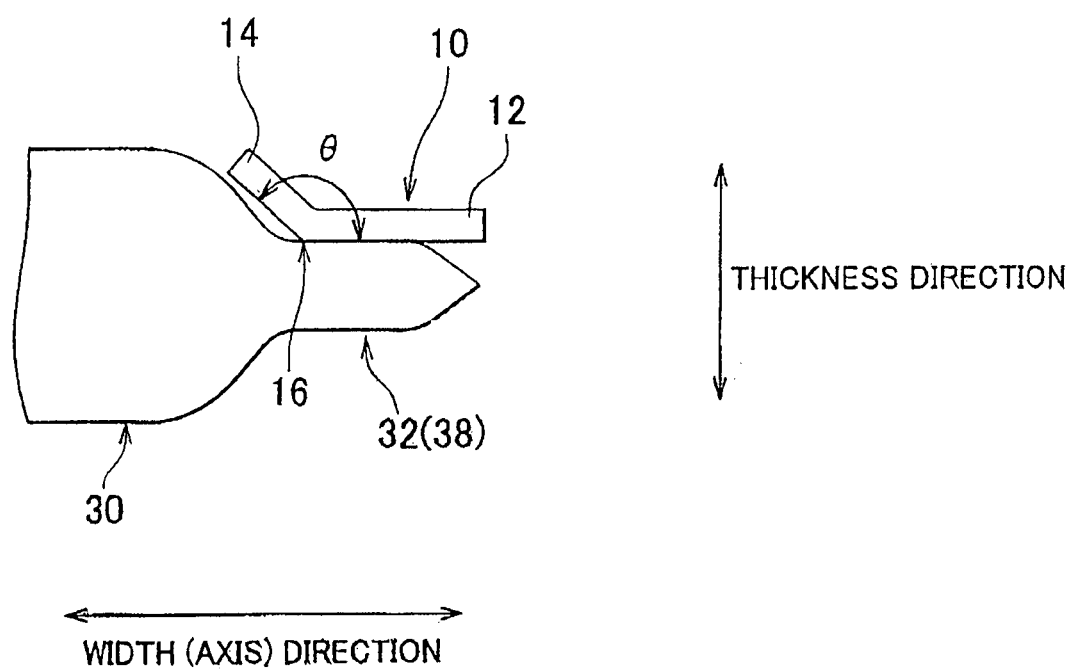

BATTERY HAVING FLAT TERMINALS

CROSS-REFERENCE TO RELATED APPLICATIONS

This application is a national phase application of International Application No. PCT/IB2008/001897, filed July 22, 2008, and claims the priority of Japanese Application No. 2007-191447, filed July 23, 2007, the contents of both of which are incorporated herein by reference.

BACKGROUND OF THE INVENTION

1. Field of the Invention

The invention relates to a structure of a battery. More specifically, the invention relates to a structure of a battery having flat terminals.

2. Description of the Related Art

In recent years, the importance of secondary batteries such as lithium ion battery and nickel hydrogen battery as on-board power sources for vehicles and power sources for personal computers and mobile terminals is increasing. In particular, lithium ion batteries, which are lightweight and can achieve high energy density, are used as on-board, high-output power sources for vehicles.

In batteries of this type, flat terminals are welded to the ends of the positive and negative electrode current collectors, which are not coated with active material, (for example, foil-type current collectors) as terminals for input and output of current. For example, Japanese Patent Application Publication No. 2002-117825 (JP-A-2002-117825) describes a method of producing a battery in which the peripheral portions of an electrode assembly (current collectors), which are not coated with an electrode active material, are stacked in layers and rod-like portions of the electrode terminals (flat terminals) are integrally welded to the stacked peripheral portions with the stacked peripheral portions compressed in their thickness direction. Other examples include JP-A-2002-231214, JP-A-11-204101, JP-A-2003-249423 and JP-A-8-185850.

In the above conventional art, however, the flat terminals must be pressed against the active material uncoated portions of the current collectors (current-collecting foils) of the electrode assembly during the welding process. Thus, the flat terminals may be deformed or bent by the pressure during the welding process and may damage the current collectors (current-collecting foils). Such damage to the current collector may adversely affect the performance and safety of the battery. Also, if the flat terminals are bent outward, when the electrode assembly is inserted into a battery case, the flat terminals may interfere with the battery case and may not be inserted into the case smoothly.

SUMMARY OF THE INVENTION

The invention provides a battery with highly rigid flat terminals.

A battery according to a first aspect of the invention includes: an electrode assembly having a current collector that forms a positive electrode and a current collector that forms a negative electrode; and a flat terminal typically having a rectangular shape and joined to each current collector (typically, to a current-collecting foil thereof). The flat terminal has a flat portion that includes a joint area that is joined to the corresponding current collector and the flat terminal has a first curved portion that is formed away from the joint area along the longitudinal direction of the flat terminal.

Meanwhile, the "flat" terminals of the invention may have another shapes if the joint area with the current collector is flat. For example, the flat terminals include terminals between which the current collector is sandwiched.

In the battery according to the first aspect, the first curved portion may be formed away from the joint area in an end portion perpendicular to the longitudinal direction of the flat terminal.

In the battery according to the first aspect, the first curved portion may be formed away from the joint area in an end portion perpendicular to the longitudinal direction of each flat terminal on the side of the center of the electrode assembly from the current collectors, and the first curved portion may rise in a curve from the flat portion (not to form sharp edges).

In the battery according to the first aspect, the first curved portion may rise in a curve from the flat portion to form a smoothly and continuously curved outer surface.

In the battery according to the first aspect, the first curved portion may be formed away from the joint area in an end portion perpendicular to the longitudinal direction of each flat terminal on the side of the center of the electrode assembly from the current collectors, and the first curved portion and the flat portion may meet at an obtuse angle.

In the battery according to the first aspect, the obtuse angle may be an angle between 120° and 150°.

In the battery according to the first aspect, the first curved portion may be partly provided partly to each flat terminal in the vicinity of the joint area of the flat terminal.

In the battery according to the first aspect, the electrode assembly may be a flattened rolled electrode assembly formed by rolling up a sheet-form positive electrode including a foil-type current collector and a sheet-form negative electrode including a foil-type current collector in layers with a separator therebetween each current-collecting foil layered portions (that is, the parts where the current-collecting foil is rolled up in layers) joined to the flat terminals at opposite ends in the direction of the rolling axis the rolled electrode assembly, each current-collecting foil layered portion has a thin portion compressed in the thickness direction of the rolled electrode assembly and has a thick portion relatively thicker than the thin portion, and each flat terminal may be joined to the thin portion of the corresponding current-collecting foil layered portion and has a second curved portion extending in a curve from the flat portion in conformity with the external shape of the thick portion.

In the battery according to the first aspect, the thick portion may be formed at an end (the end here is considered to be the end which is located at the top when the battery is installed in a normal position. Typically, the rolling axis of the rolled electrode assembly extends in a horizontal direction and the current-collecting foil layered portions are located at opposite ends of the electrode assembly in the horizontal direction) of each current-collecting foil layered portion.

The battery according to the first aspect, may further include: a box-shaped container (typically, a hexahedral rectangular container) for housing the electrode assembly; and relay terminals extending from an external face of the container and connected to the flat terminals, wherein the joint areas of the flat terminals joined to the current collectors may be located farther away from the center of the electrode assembly than the relay terminals, and each flat terminal may have a third curved portion extending in a curve from the flat portion to connect the corresponding relay terminal and the joint area of the flat terminal.

The battery according to the first aspect may be a lithium ion battery.

A vehicle according to a second aspect of the invention is provided with a battery according to the first aspect.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 1A is a front view schematically illustrating the configuration of a lithium ion battery according to a first embodiment of the invention.

FIG. 1B is a side view schematically illustrating the configuration of a lithium ion battery according to the first embodiment of the invention.

FIG. 3 is a view illustrating a modification of a flat terminal.

DETAILED DESCRIPTION OF EMBODIMENTS

Figure 2A:
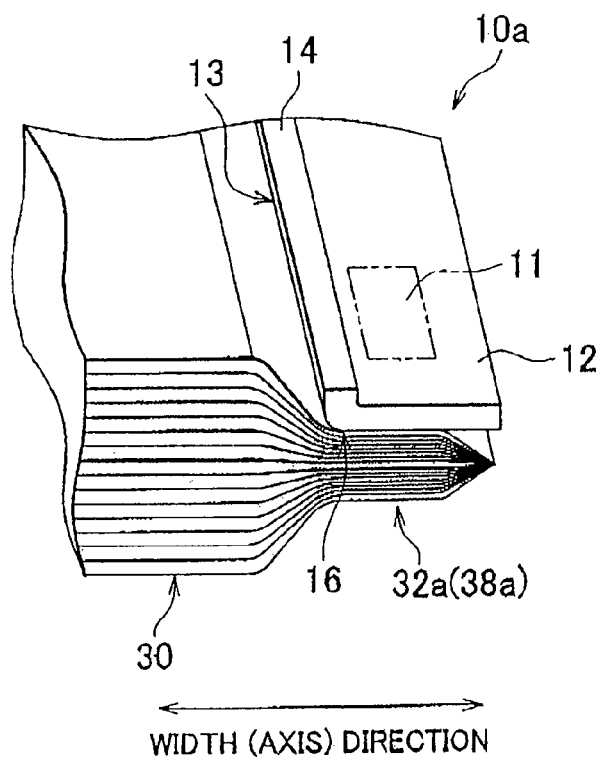
FIG. 2A is an enlarged external perspective view of an essential part of a positive electrode flat terminal of the invention.

Embodiments of the invention are described below with reference to the drawings. The members and parts having the same function are designated in all the drawings by the same reference numerals. The invention is not limited to the enumerated embodiments. The dimensional relationships (length, width, thickness, etc.) of the drawings are not necessarily to scale.

Referring now to FIG. 1A and FIG. 1B, the configuration of a battery 100 is described. FIG. 1A is a front view schematically illustrating the configuration of a lithium ion battery (secondary battery) 100 according to a first embodiment of the invention, and FIG. 1B is a side view thereof. As shown in FIG. 1, the lithium ion battery 100 has an electrode assembly 30 that includes a sheet-form positive electrode having a foil-type current collector (current-collecting foil) and a sheet-form negative electrode having a foil-type current collector (current-collecting foil); and flat terminals 10 as current-collecting terminals connected to the electrode assembly 30. In FIG. 1A and FIG. 1B, a positive electrode side flat terminal (positive electrode flat terminal 10a) and a negative electrode side flat terminal (negative electrode flat terminal 10b) are shown as the flat terminals 10. The electrode assembly 30 of the first embodiment is constituted of specific constituent components for a battery (active materials for respective positive and negative electrodes, current collectors for respective positive and negative electrodes, separators, etc.) as is a typical unit cell. Here, a rolled electrode assembly 30 having a flat shape as described later is used as the electrode assembly 30. A current-collecting foil layered portions 32 (a positive electrode current-collecting foil layered portion 32a as a positive electrode side current-collecting foil layered portion and a negative electrode current-collecting foil layered portion 32b as a negative electrode side current-collecting foil layered portion shown in FIG. 1A and FIG. 1B) are formed at opposite ends of the electrode assembly 30 in the width direction thereof (horizontal direction; the direction of the rolling axis of the rolled electrode assembly 30). The current-collecting foil layered portions 32 correspond to active material uncoated portions (active material layer-free portions) of the rolled electrode assembly 30, which Pare described later.

The flat terminals 10 (positive electrode flat terminal 10a and negative electrode flat terminal 10b) are respectively joined to the current-collecting foil layered portion 32 (positive electrode current-collecting foil layered portion 32a and negative electrode current-collecting foil layered portion 32b). The flat terminals 10 of the first embodiment are plate-like (generally rectangular) conductive members and disposed such that their longitudinal direction extends along the side edges (that is, in the height direction) of the current-collecting foil layered portions 32.

The material of the flat terminals 10 may be the same as that used in conventional batteries, and the flat terminals 10 may be made of the same material as that of the current-collecting foils to which they are joined. For example, aluminum may be used as the material of the positive electrode current-collecting foil and the positive electrode flat terminal, and copper may be used as the material of the negative electrode current-collecting foil and the negative electrode flat terminal.

Each flat terminal 10 (positive electrode flat terminal 10a, negative electrode flat terminal 10b) has a flat portion 12 (a positive electrode flat portion 12a as a positive electrode side flat portion, a negative electrode flat portion 12b as a negative electrode side flat portion, shown in FIG. 1A and FIG. 1B), a curved portion (high-rigidity portion of the invention; first curved portion) 14 (a first positive electrode side curved portion 14a as a positive electrode side curved portion, a first negative electrode side curved portion 14b as a negative electrode side curved portion, shown in FIG. 1A and FIG. 1B). The flat portion 12 has a flat surface (that is, has a substantially linear cross section) and forms the main part of the flat terminal 10. The curved portion 14 has a curved surface that extends from the flat portion 12 and is formed away from the joint area in an end portion 13 perpendicular to the longitudinal direction of the flat terminal 10. In this embodiment, the curved portion 14 is formed away from the joint area in an inner end portion 13 perpendicular to the longitudinal direction of the flat terminals 10 in the width direction of the electrode assembly. Such a curved portion 14 may be formed easily by bending the flat terminal 10.

The flat portion 12 has a joint area 11 (a positive electrode joint area 11a as a positive electrode side joint area, a negative electrode joint area 11b as a negative electrode side joint area, shown in FIG. 1A and FIG. 1B) that is joined to the electrode assembly 30 on its lower surfaces. That is, the flat terminal 10 and the current-collecting foil layered portion 32 are joined to each other via the joint area 11 of the flat portion 12. The joint (typically welded) may be made by any method typically used to join current collectors and may be achieved by ultrasonic welding or spot welding, for example. In this case, the joint area 11 of the flat terminal 10 is welded to the current-collecting foil layered portion 32 under pressure.

According to the battery 100 of the first embodiment, the end portions 13 perpendicular to the longitudinal direction of the flat terminals 10 are bent to increase the rigidity of the flat terminals 10. Thus, when the flat terminals 10 are joined to the electrode assembly 30 (in particular, when the joint areas 11 of the flat terminals 10 are pressed against the current-collecting foil layered portions 32), deformation (bend or distortion, for example) of the flat terminals 10 is avoided. As a result, adverse effects caused by the deformation of the flat terminals 10 (damage to the current-collecting foils or low production yield due to poor insertability into a battery case, for example) may be reduced.

While an example in which the curved portions 14 are provided away from the joint area in the inner end portion 13 perpendicular to the longitudinal direction in the width direction of the electrode assembly is shown in the first embodiment, outer end portion 15 perpendicular to the longitudinal direction may be bent. Even in this case, the rigidity of the flat terminals may be increased and deformation of the flat terminals during the welding process may be reduced.

The bend as described above may be provided along the entire end portions perpendicular to the longitudinal direction or may be selectively provided along a portion of the end portions perpendicular to the longitudinal direction. When the bend is selectively provided, it is a good idea to provide the curved portions in the vicinity of the joint areas of the flat terminals. Then, deformation of the flat terminals during the welding process may thus be avoided.

Figure 2B:
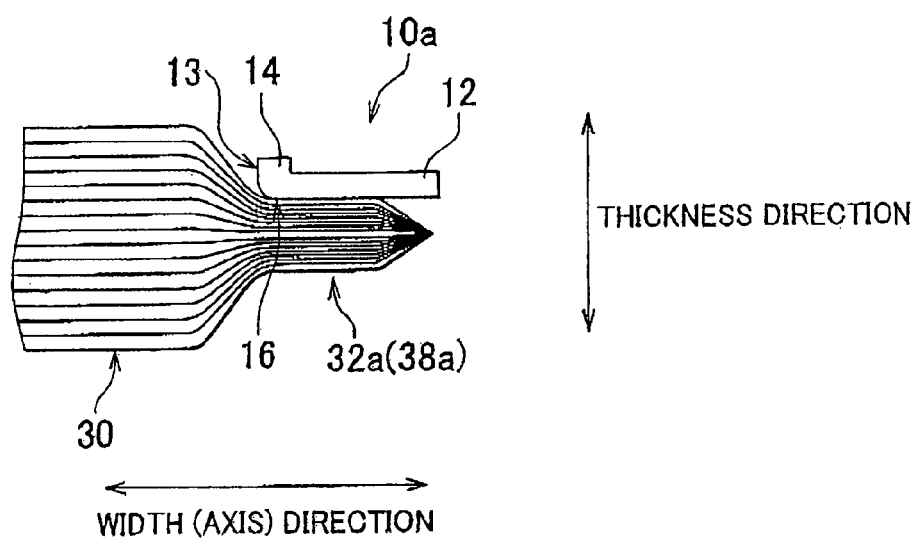
FIG. 2B is a cross-sectional view taken along the line IIB-IIB of FIG. 1A.

The configuration of the battery 100 of the first embodiment, in particular, the structures of the electrode assembly 30 and the flat terminals 10 are next described. FIG. 2A is an enlarged external perspective view of an essential part of the positive electrode flat terminal 10a of the invention, and FIG. 2B is a cross-sectional view taken along the line IIB-IIB of FIG. 1A.

The rolled electrode assembly 30 of the first embodiment is constituted of a sheet-form positive electrode 34a (which is hereinafter referred to as "positive electrode sheet 34a"); a sheet-form negative electrode 34b (which is hereinafter referred to as "negative electrode sheet 34b"); and two sheet-form separators (which are hereinafter referred to as "separator sheets") as is a typical rolled electrode assembly for a lithium ion battery.

The positive electrode sheet 34a is prepared by applying a positive-electrode active material layer for a battery to the both sides of an elongated positive electrode current-collecting foil. The positive-electrode active material layer is not applied to areas along a longitudinal edge of the positive electrode sheet 34a to form a positive-electrode active material layer-free portion 38a where the positive electrode current-collecting foil is exposed in a predetermined width. The negative electrode sheet 34b has a configuration similar to that of the positive electrode sheet 34a, and formed by applying a negative-electrode active material layer for a battery to both sides of an elongated negative electrode current-collecting foil. A negative-electrode active material layer-free portion 38b where the negative electrode current-collecting foil is exposed is formed along an edge of the negative electrode sheet 34b.

Then, the positive electrode sheet 34a and the negative electrode sheet 34b are stacked together with the separator sheets and rolled up in an offset relationship so that the positive-electrode active material layer-free portion 38a and the negative-electrode active material layer-free portion 38b extend beyond an edge of the other sheet. Then, the thus obtained roll is flattened in a radial direction from the side to form a flat rolled electrode assembly 30.

Because the positive electrode sheet 34a and the negative electrode sheet 34b are rolled up in an offset relationship as described above, the positive-electrode active material layer-free portion 38a (that is, the positive electrode current-collecting foil layered portion 32a where the positive electrode current-collecting foil is exposed) and the negative-electrode active material layer-free portion 38b (that is, the negative electrode current-collecting foil layered portion 32b where the negative electrode current-collecting foil is exposed) protrude outward. The exposed positive electrode current-collecting foil layered portion 32a and negative electrode current-collecting foil layered portion 32b form end portions in the rolling axis direction of the rolled electrode assembly 30 (width direction, that is, the horizontal direction) as shown in FIG. 1A, and the edges of the end portions in the axis direction (width direction) are compressed in the thickness direction of the rolled electrode assembly 30 and joined together as shown in FIG. 2A and FIG. 2B. The positive electrode flat terminal 10a and the negative electrode flat terminal 10b are joined to the thus compressed positive electrode current-collecting foil layered portion 32a and negative electrode current-collecting foil layered portion 32b, respectively.

The positive electrode flat terminal 10a of the first embodiment is curved such that the outer surfaces of the curved portion 14 and the flat portion 12 merge smoothly into each other at a connection portion (bent portion) 16 between the curved portion 14 and the flat portion 12, as shown in FIG. 2A and FIG. 2B. That is, the degree of the curve (curvature) of the curved portion 14 is almost zero (that is, almost linear) at the boundary between the curved portion 14 and the flat portion 12 and gradually increases to a desired value so that the curved portion 14 and the planar flat portion 12 merge smoothly into each other at the connection portion 16.

As the flat portion 12 and the curved portion 14 are formed continuously so as to form as few corners (edges) as possible between the two portions, as described above, the positive electrode flat terminal 10a is not damaged by corners (edges) during the welding to the current collector.

Even if the flat portion 12 and the curved portion 14 meet in an angular relationship (that is, do not merge smoothly into each other) at the connection portion 16, the positive electrode flat terminal 10a is not damaged during the welding to the current collector depending on the degree of the bend. That is, when the angle θ formed by the curved portion 14 and the flat portion 12 is an obtuse angle (for example, 120 to 150° as shown in FIG. 3, because the positive electrode flat terminal 10a contacts the obtuse angle corner (edge) during the welding to the current collector, the positive electrode flat terminal 10a is not damaged by the corner (edge).

Figure 4:
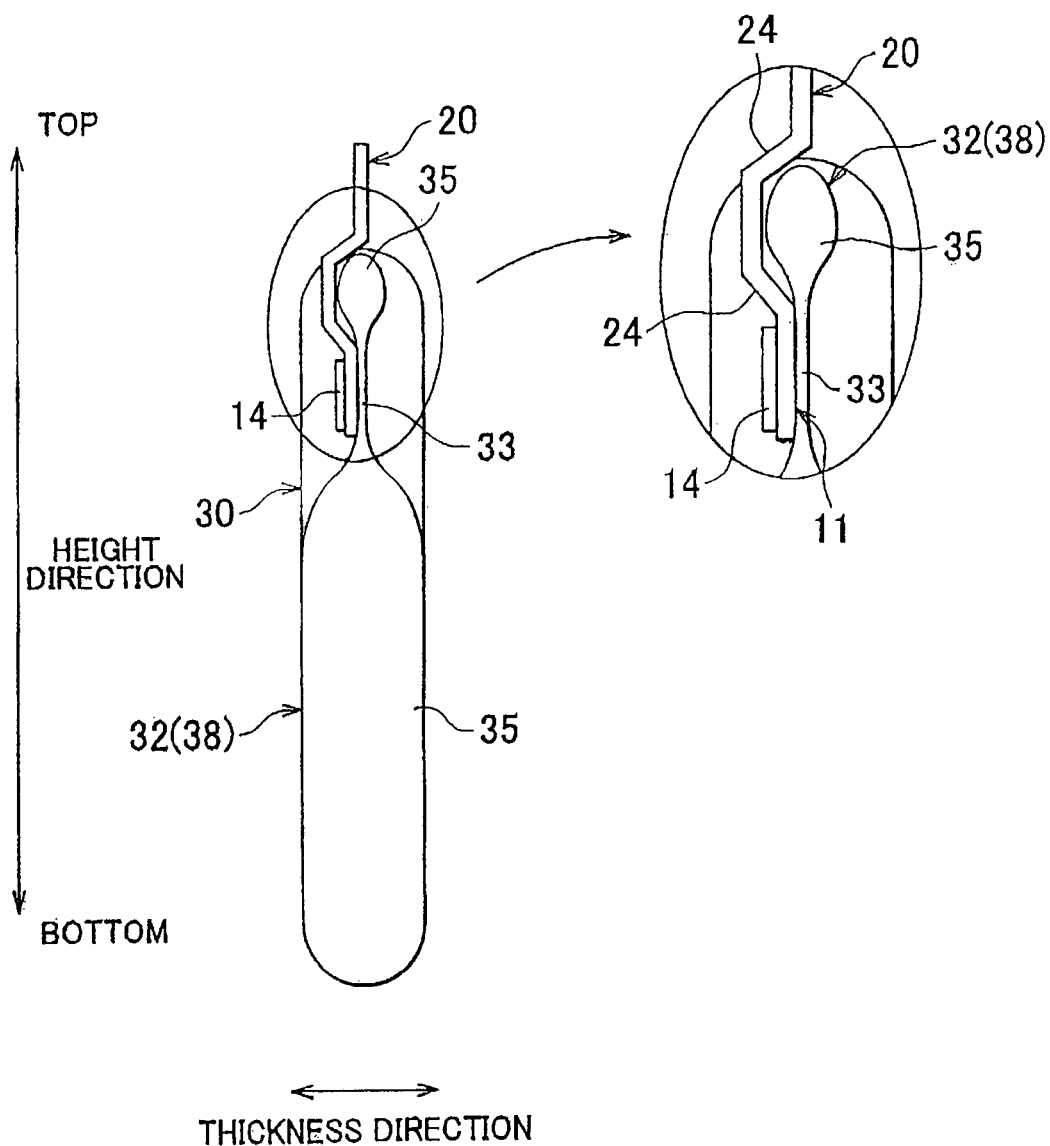
FIG. 4 is a view illustrating one example of a second embodiment of the invention.

Referring next to FIG. 4, a second embodiment of the invention will be described. The flat terminals 20 of the second embodiment differ from the flat terminals 10 in that the flat terminals 20 have a second curved portion 24 in addition to the first curved portion 14. Therefore, the same constituent components as those of the flat terminals 10 are designated by the same numerals and redundant description is omitted. Also, because this embodiment is applicable to both the positive electrode side and the negative electrode side, description is made without distinction made between positive electrode and negative electrode.

In the second embodiment, each current-collecting foil layered portion 32 has a thin portion 33 compressed in the thickness direction of the rolled electrode assembly 30 and thick portions 35 which are not compressed in the thickness direction of the rolled electrode assembly 30 and thus are bulgy as shown in FIG. 4. Each current-collecting foil layered portion 32 of the second embodiment has one thin portion 33 and two thick portions 35 formed by pressing it from both sides in the thickness direction at a position slightly below the upper end in the height direction. The joint area 11 of the corresponding flat terminal 20 is joined to the thin portion 33. In other words, in the second embodiment each current-collecting foil layered portion 32 is not flattened except for the part to which the flat terminal 20 is joined (thin portion 33).

Each flat terminal 20 has a second curved portion 24 bent in conformity with the external shape of the thick portions 35 of the current-collecting foil layered portions 32. In the second embodiment, each flat terminal 20 is bent in conformity with the external shape of the upper thick portions 35 at the upper ends of the current-collecting foil layered portions 32 in the height direction.

According to a battery configured as described above, because the flat terminals 20 are bent to form the second curved portions 24, the rigidity of the flat terminals 20 is further increased and deformation (bend or the like) of the flat terminals may be prevented more reliably.

Also, because each current-collecting foil layered portion 32 is not compressed except for the part to which the flat terminal 20 is joined (thin portion 33), adverse effects caused by compressing the current-collecting foil layered portion 32 (such as breakage of the foil) is reduced. As a result, the quality of the battery is improved and stabilized. In addition, because the thick portions 35 of the current-collecting foils are provided at the upper ends of the current-collecting foils, which are especially likely to suffer the adverse effects caused by compression (such as breakage of the foil), the adverse effects are minimized.

Figure 5:
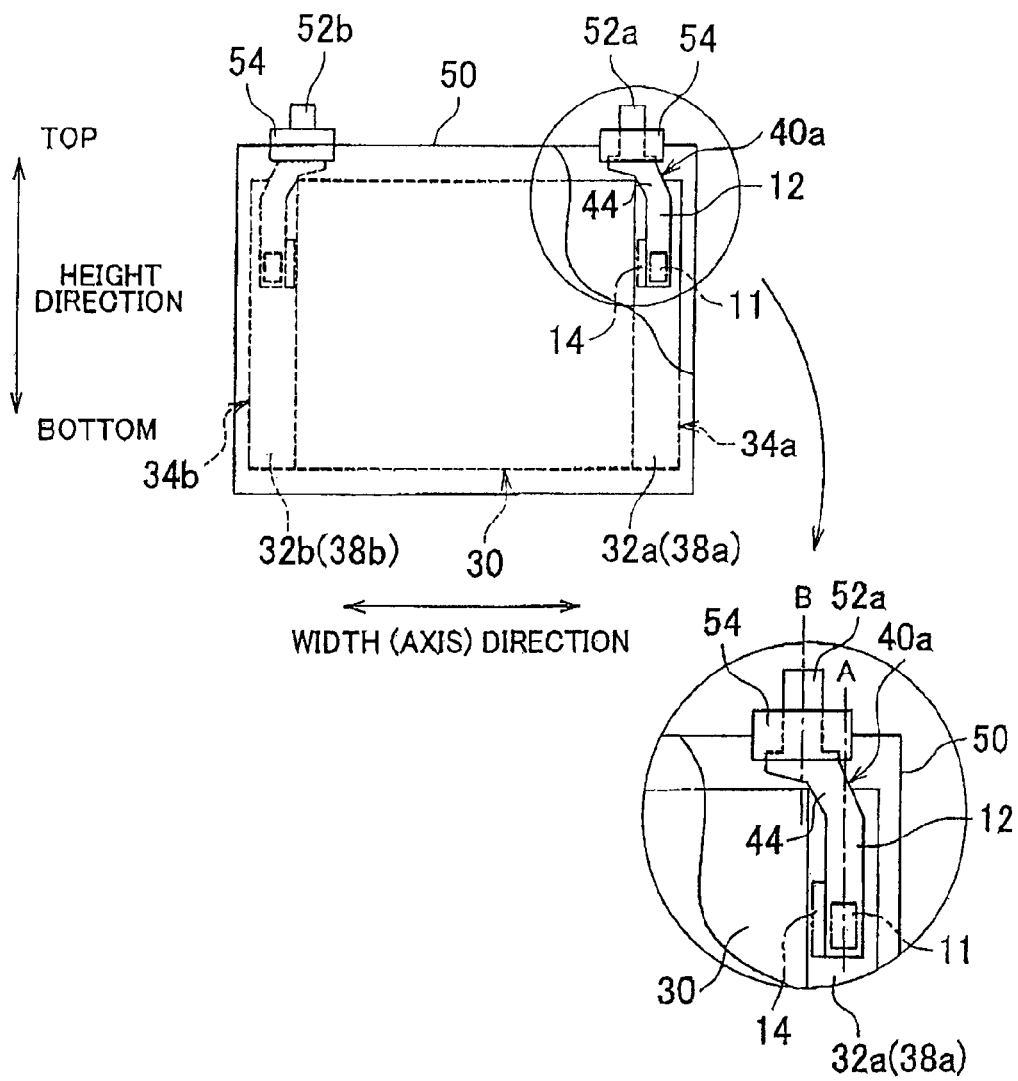
FIG. 5 is a view illustrating one example of a third embodiment of the invention.

Referring next to FIG. 5, a third embodiment of the invention will be described. The flat terminals 40 of the third embodiment differ from the flat terminals 10 in that the flat terminals 40 have a third curved portion 44 in addition to the first curved portion 14. Therefore, the same constituent components as those of the flat terminals 10 are designated by the same numerals and redundant description is omitted. Also, this embodiment is also applicable to both the positive electrode side and the negative electrode side.

In the third embodiment, a container 50 for housing the electrode assembly 30 is provided as shown in FIG. 5. The container 50 of the third embodiment is shaped to accommodate the flat rolled electrode assembly 30 (a box-shape container, more specifically, a rectangular box-shape container in the illustrated example). Although the container 50 may be made of any material that is typically used for unit cells, the use of a container made of a thin metal material (such as aluminum) or a synthetic resin, for example, is preferred from the standpoint of weight reduction of the resulting battery.

Relay terminals 52a and 52b protrude from an external wall (top wall in the illustrated example) of the container 50. Each relay terminal (positive electrode relay terminal 52a, negative electrode relay terminal 52b) of the third embodiment is inserted into an opening formed through the top wall of the container 50 and connected to the corresponding flat terminal 40 (positive electrode flat terminal 40a as a positive electrode side flat terminal, a negative electrode flat terminal 40b as a negative electrode side flat terminal shown in FIG. 5) in the container 50. The relay terminals 52a and 52b are thus electrically connected to the current-collecting foils (positive electrode current-collecting foil layered portion 32a and negative electrode current-collecting foil layered portion 32b) of the electrode assembly 30 via the flat terminals 40 (positive electrode flat terminal 40a and negative electrode flat terminal 40b). The openings of the upper wall of the container through which the relay terminals 52a and 52b are inserted are sealed by seal members 54 (such as gaskets or resin members) to ensure the airtightness of the battery.

The joint area 11 of the flat terminals 40 (positive electrode flat terminal 40a, negative electrode flat terminal 40b) joined to the current-collecting foil layered portions 32 (positive electrode current-collecting foil layered portion 32a, negative electrode current-collecting foil layered portion 32b) are located outside the relay terminals 52a and 52b in the width direction of the electrode assembly. More specifically, the center lines A of the areas where the flat terminals 40 are welded to the electrode assembly 30 are not in alignment with the center lines B of the relay terminals 52a and 52b (the center lines of the seal members 54) but located outside the center lines B of the relay terminals 52a and 52b as viewed in a front view.

The flat terminals 40 have third curved portions 44 that connect the joint areas 11 and the relay terminals 52a and 52b. That is, the flat portions 12, including the joint areas 11, of the flat terminals 10 shown in FIG. 1A and FIG. 1B extend straight in the height direction and are connected to the relay terminals 52a and 52b, whereas the flat terminals 40 shown in FIG. 5 are connected to the relay terminals 52a and 52b via curved portions 44 that extend in a curve from the flat portions 12 including the joint areas 11.

Because the flat terminals 40 have third curved portions 44 as described above, the rigidity of the flat terminal 40 is further increased. Also, because the joint areas 11 where the flat terminals 40 are joined to the current-collecting foil layered portions 32 are located outside the relay terminals 52a and 52b, the areas around the relay terminals 52a and 52b (that is, the sealing areas of the seal members 54) are sufficiently large and the distance between the container 50 and the electrode assembly 30 may be reduced. When the distance between the container 50 and the electrode assembly 30 is reduced as described above, the electrode assembly 30 may be housed in the container 50 with high space efficiency. This allows for a reduction in size and cost of the battery.

Next, the configuration of the battery usable in the third embodiment and the materials of the battery will be described in detail. As described before, the battery 100 has an electrode assembly 30 having a positive electrode and a negative electrode; and a container 50 that houses the electrode assembly 30 and electrolyte.

First, the configuration of the container 50 will be described. Although the container 50 may be made of any material that is generally used for unit cells without limitation, the use of a relatively lightweight material is preferred. Suitable examples include a metal container with surfaces coated with an insulating resin and a container made of a polyolefin resin such as polypropylene or other suitable synthetic resin.

The materials and components for the rolled electrode assembly 30 are not particularly limited and may be the same as those used for an electrode assembly of a conventional lithium ion battery. For example, the positive electrode sheet 34a may be formed by applying positive-electrode active material layers for a lithium ion battery to an elongated positive electrode current-collecting foil. Aluminum foil (third embodiment) or some other metal foil suitable for a positive electrode may be used as the positive electrode current collector. One or more substances generally used in lithium ion batteries can be used as the positive-electrode active material without limitation. Suitable examples include $LiMn_2O_4$, $LiCoO_2$ and $LiNiO_2$. For example, the positive electrode sheet 34a may be formed using by coating the surfaces of an aluminum foil, with a length of 2 to 4 m (2.7 m, for example), a width of 8 to 12 cm (10 cm, for example) and a thickness of 5 to 20 μm (15 μm, for example), with positive-electrode active material layers for a lithium ion battery, composed primarily of lithium nickelate (88% by mass of lithium nickelate, 10% by mass of acetylene black, 1% by mass of polytetrafluoroethylene and 1% by mass of carboxymethyl cellulose, for example) are formed on the surfaces of the aluminum foil by a conventional method, the positive electrode sheet 34a can be obtained.

The negative electrode sheet 34b is formed by applying negative-electrode active material layers for a lithium ion battery to an elongated negative electrode current-collecting foil. Copper foil (third embodiment) or some other metal foil suitable for a negative electrode may be used as the negative electrode current collector. One or more substances generally used in lithium ion batteries may be used as the negative-electrode active material without limitation. Suitable examples include carbon materials such as graphite carbon and amorphous carbon and lithium-containing transition metal oxides and transition metal nitrides. For example, the negative electrode sheet 34b may be formed using by coating the surfaces of a copper foil, with a length of 2 to 4 m (2.9 m, for example), a width of 8 to 12 cm (10 cm, for example) and a thickness of 5 to 20 μm (10 μm, for example), with negative-electrode active material layers for a lithium ion battery, composed primarily of black lead (98% by mass of black lead, 1% by mass of styrene-butadiene rubber and 1% by mass of carboxymethyl cellulose, for example), using conventional methods.

Sheets of a porous polyolefin resin may be used as the separator sheets for use between the positive electrode sheet 34a and the negative electrode sheet 34b. For example, porous separator sheets made of a synthetic resin (for example, polyolefin such as polyethylene) with a length of 2 to 4 m (3.1 m, for example), a width of 8 to 12 cm (11 cm, for example) and a thickness of 5 to 30 μm (25 μm, for example) may be used. When a solid electrolyte or gelatinous electrolyte is used as the electrolyte, the separators may unnecessary (in this case, the electrolyte itself functions as separators).

Next, the configuration of the electrolyte housed in the container 50 together with the rolled electrode assembly 30 will be described. The electrolyte of the third embodiment is a lithium salt such as $LiPF_6$. In the third embodiment, an appropriate amount (concentration of 1 M, for example) of a lithium salt such as $LiPF_6$ is dissolved in a nonaqueous electrolytic solution, such as a mixed solution of diethyl carbonate and ethylene carbonate (mass ratio of 1:1, for example), and the resulting solution is used as the electrolytic solution.

Figure 6:
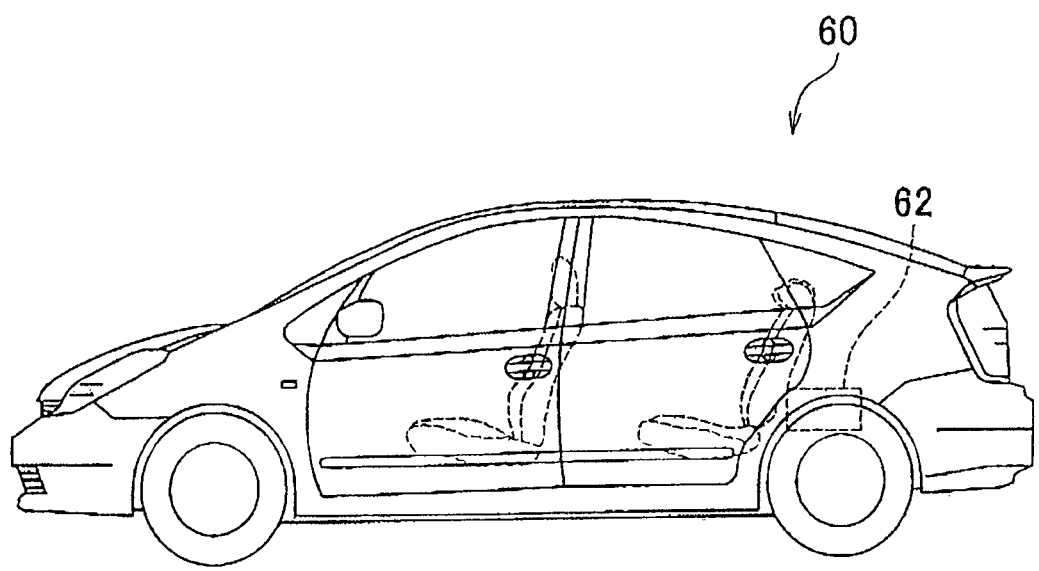
FIG. 6 is a side view schematically illustrating a vehicle (motorcar) provided with a battery of the invention.

The battery 100 according to the third embodiment may be used as a power source for a motor (electric motor) mounted in a vehicle such as a motorcar. That is, when the batteries 100 according to the third embodiment are stacked on top of one another in a prescribed direction and the unit cells are held together in the stacking direction to form an assembled battery 62 as shown in FIG. 6, a vehicle 60 that is powered by the assembled battery 62 (typically a motorcar, particularly a vehicle having an electric motor such as hybrid vehicle, electrical vehicle or fuel cell vehicle) is provided.

While the invention has been described by way of example embodiments, it should be noted that the description is not intended to limit the invention and various modifications may be made to the invention. For example, the type of the sealed battery is not limited to the lithium ion battery as described above, and the battery may be a battery of different type with an electrode assembly made of different materials and different electrolyte such as lithium secondary battery having a negative electrode of lithium metal or a lithium alloy, nickel hydrogen battery, nickel-cadmium battery or electrical double layer capacitor.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A battery, comprising:
an electrode assembly having a current collector that forms a positive electrode and a second current collector that forms a negative electrode,
a flat terminal joined only to a single surface of the current collector at a first end of the flat electrode assembly in a width direction of the flat electrode assembly, wherein a surface of the first flat terminal, which projects from a container accommodating the flat electrode assembly, is parallel to a side surface of the flat electrode assembly, and
a second flat terminal joined only to a single surface of the second current collector at a second end of the flat electrode assembly in the width direction of the flat electrode assembly, wherein a surface of the second flat terminal, which projects from the container accommodating the flat electrode assembly, is parallel to the side surface of the flat electrode assembly, wherein:
the first flat terminal has a first flat portion that includes a joint area joined to the first current collector,
the first flat terminal has a first positive curved portion that is formed away from the joint area along the longitudinal direction of the first flat terminal,
the first positive curved portion rises in a curve from the first flat portion,
the first positive curved portion is provided on at least one of a first inner end portion and a first outer end portion of the first flat terminal in the width direction of the flat electrode assembly,
the second flat terminal has a second flat portion that includes a joint area joined to the second current collector,
the second flat terminal has a first negative curved portion that is formed away from the joint area of the second flat portion along the longitudinal direction of the second flat terminal,
the first negative curved portion rises in a curve from the second flat portion, and
the first negative cured portion is provided on at least one of a second inner end portion and a second outer end portion of the second flat terminal in the width direction of the flat electrode assembly.

2. The battery according to claim 1, wherein the first positive curved portion is formed in the first inner portion perpendicular to the longitudinal direction of each the flat terminal on the side of the center of the flat electrode assembly from the first and second current collectors.

3. The battery according to claim 2, wherein the first positive curved portion rises in a curve from the first flat portion to form a smoothly and continuously curved outer surface.

4. The battery according to claim 1, wherein the first positive curved portion is formed in the first inner end portion perpendicular to the longitudinal direction of each flat terminal on the side of the center of the flat electrode assembly from the first and second current collectors, and the first positive curved portion and the first flat portion meet at an obtuse angle.

5. The battery according to claims 4, wherein the obtuse angle is an angle between 120° and 150°.

6. The battery according to claim 1, wherein the first positive curved portion is provided partly to the first flat terminal in the vicinity of the joint area of the first flat terminal.

7. The battery according to claims 1 wherein:
the flat electrode assembly is a flattened rolled electrode assembly that is formed by rolling up a sheet-form positive electrode including a foil-type current collector and a sheet-form negative electrode including a foil-type current collector in layers with a separator therebetween,
each current-collecting foil layered portion is joined to the flat terminals at opposite ends in the direction of the rolling axis of the rolled electrode assembly,
each current-collecting foil layered portion has a thin portion compressed in the thickness direction of the rolled electrode assembly and has a thick portion relatively thicker than the thin portion, and
each flat terminal is joined to the thin portion of the corresponding current-collecting foil layered portion and has a second curved portion extending in a curve from the flat portion in conformity with the external shape of the thick portion.

8. The battery according to claims 7, wherein the thick portion is formed at an end of each current-collecting foil layered portion.

9. The battery according to claim 1, further comprising:
relay terminals that extend from an external face of the container and that are connected to the flat terminals, wherein:
joint areas of the flat terminals joined to the first and second current collectors are locate farther away from the center of the flat electrode assembly than the relay terminals in such a manner that the joint areas are located outside the relay terminals in the width direction of the flat electrode assembly, and
each flat terminal has a third curved portion extending in a curve from the respective flat portion to connect the corresponding relay terminal and the joint area of the flat terminal.

10. The battery according to claims 1, wherein the battery is a lithium ion battery.

11. A vehicle equipped with a battery according to claims 1.

12. The battery according to claim 1, wherein
the first flat terminal is a single member and projects from the flat electrode assembly in an axial direction of the battery, and
the second flat terminal is a single member and projects from the flat electrode assembly in the axial direction of the battery.

13. A battery, comprising:
a flat electrode assembly having a first current collector that forms a positive electrode and a second current collector that forms a negative electrode,
a first flat terminal joined only to t single surface of one of the first and second current collectors, where in a surface of the first flat terminal, which projects from a container accommodating the flat electrode assembly, is parallel to a side surface of the flat electrode assembly,
and a second flat terminal joined only to a single surface of another one of the first and second current collectors, wherein a surface of the second flat terminal, which projects from the container accommodating the flat electrode assembly, is parallel to the side surface of the flat electrode assembly, wherein:
each flat terminal has a flat portion that includes a joint area joined to the corresponding current collector,
each flat terminal has a first curved portion that is formed in an end portion perpendicular to the longitudinal direction of the flat terminal and that is formed in a curve from the flat portion,
the flat electrode assembly is a flattened rolled electrode assembly that is formed by rolling up a sheet-form positive electrode including a foil-type current collector and a sheet-form negative electrode including a foil-type current in layers with a separator therebetween,
each current-collecting foil layered portion is joined to one of the first and second flat terminals at opposite ends in the direction of the rolling axis of the rolled electrode assembly,
each current-collecting foil layered portion has a thin portion compressed in the thickness direction of the rolled electrode assembly and has a thick portion relatively thicker than the thin portion, and
each flat terminal is joined to the thin portion of the corresponding current-collecting foil layered portion and has a second curved portion extending in a curve from the flat portion in conformity with the external shape of the thick portion, and
the thick portion is formed at an end of each current-collecting foil layered portion.

* * * * *